US008363566B2

(12) United States Patent
Hao et al.

(10) Patent No.: US 8,363,566 B2
(45) Date of Patent: Jan. 29, 2013

(54) SENDING METHOD AND DEVICE FOR SCHEDULING REQUEST (SR) SIGNAL

(75) Inventors: Peng Hao, Shenzhen (CN); Chunli Liang, Shenzhen (CN); Bo Dai, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 368 days.

(21) Appl. No.: 12/866,980

(22) PCT Filed: Jun. 5, 2009

(86) PCT No.: PCT/CN2009/072165
§ 371 (c)(1),
(2), (4) Date: Aug. 10, 2010

(87) PCT Pub. No.: WO2010/045795
PCT Pub. Date: Apr. 29, 2010

(65) Prior Publication Data
US 2010/0329142 A1 Dec. 30, 2010

(30) Foreign Application Priority Data

Oct. 24, 2008 (CN) .......................... 2008 1 0170643

(51) Int. Cl.
*H04L 12/26* (2006.01)
(52) U.S. Cl. ........ 370/252; 370/329; 370/330; 370/344; 370/311; 370/280
(58) Field of Classification Search .................. 370/252, 370/329, 330, 311, 344, 280, 345, 328
See application file for complete search history.

(56) References Cited

U.S. PATENT DOCUMENTS 7,688,770 B2 * 3/2010 Jang et al. ..................... 370/311
7,778,151 B2 * 8/2010 Bertrand et al. .............. 370/208
(Continued)

FOREIGN PATENT DOCUMENTS

EP 2034631 A1 3/2009
EP 2077677 A1 7/2009
(Continued)

OTHER PUBLICATIONS

International Search Report on international application No. PCT/CN2009/072165, mailed on Sep. 17, 2009.
(Continued)

*Primary Examiner* — Ricky Ngo
*Assistant Examiner* — Rasheed Gidado
(74) *Attorney, Agent, or Firm* — Schiff Hardin LLP

(57) ABSTRACT

A method and device for sending a scheduling request (SR) signal are used for a user equipment (UE) in a long term evolution system to send an uplink signal to a base station. The method includes: if a time length of a radio frame is less than an SR periodicity, a sending frame and a subframe for the SR signal are determined after shifting an SR subframe offset from a starting subframe of a first radio frame of multiple consecutive radio frames which have a total time length equal to the SR periodicity; if a time length of a radio frame is equal to or greater than the SR periodicity, each radio frame is determined as the sending frame for the SR signal, and if a time length of a radio frame is equal to the SR periodicity, a subframe of the sending frame is determined after shifting the SR subframe offset from the starting subframe of the sending frame; if a time length of a radio frame is greater than the SR periodicity, a subframe of the sending frame is determined after shifting the SR subframe offset from the starting subframe of a radio half-frame; and the UE sends the SR signal to the base station in the determined subframe of the sending frame.

12 Claims, 4 Drawing Sheets

U.S. PATENT DOCUMENTS

| | | | | |
|---|---|---|---|---|
| 7,852,743 | B2 * | 12/2010 | Kwon et al. | 370/203 |
| 7,965,657 | B2 * | 6/2011 | Muharemovic et al. | 370/256 |
| 8,054,767 | B2 * | 11/2011 | Choi et al. | 370/280 |
| 8,179,857 | B2 * | 5/2012 | Kwon et al. | 370/330 |
| 2007/0201397 | A1 * | 8/2007 | Zhang | 370/329 |
| 2009/0290570 | A1 | 11/2009 | Kishiyama et al. | |
| 2009/0316811 | A1 | 12/2009 | Maeda et al. | |

FOREIGN PATENT DOCUMENTS

| | | |
|---|---|---|
| RU | 2322773 C2 | 9/2007 |
| WO | 2006134946 A1 | 12/2006 |
| WO | 2007148586 A1 | 12/2007 |
| WO | 2008022502 A1 | 2/2008 |
| WO | 2008050467 A1 | 5/2008 |

OTHER PUBLICATIONS

English Translation of the Written Opinion of the International Search Authority in international application No. PCT/CN2009/072165, mailed on Sep. 17, 2009.

Technical Specification Group Radio Access Network, 3GPPTS 36.213, V8.4.0 (Sep. 2008).

Supplementary European Search Report in European application No. 09821516.3, mailed on Mar. 14, 2012.

UL SRI Parameters Configuration, Aug. 22, 2008.

SRI Resource Configuration on PUCCH, Jul. 4, 2008.

CATT, RITT, UL SRI Parameters Configuration, 3GPP TSG RAN WGI meeting #54, Jeju, Korea, Aug. 18-22, 2008, 2 pages.

Texas Instruments, SRI Resource Configuration on PUCCH, 3GPP TSG RAN WGI #536, Warsaw, Poland, Jun. 30-Jul. 4, 2008, 2 pages.

* cited by examiner

SENDING METHOD AND DEVICE FOR SCHEDULING REQUEST (SR) SIGNAL

TECHNICAL FIELD

The present invention relates to a method for sending an uplink signal in a communication system, and particularly to a method and a corresponding device for a mobile terminal to send a scheduling request signal to a base station in a long term evolution (LTE) system.

BACKGROUND

FIG. 1 is a schematic diagram illustrating a frame structure in a time division duplex (TDD) mode in an LTE system. The frame structure is also referred to as frame structure type 2. In the frame structure, one 10 ms (which occupies 307200 Ts, with 30720 Ts/ms) radio frame is divided into two half-frames, the length of each half-frame is 5 ms (i.e. 153600 Ts), each half-frame contains 5 subframes, and the length of each subframe is 1 ms. The function of each subframe is shown in Table 1. Specifically, D denotes a downlink subframe for transmitting a downlink signal, and U denotes an uplink subframe (also referred to as a normal uplink subframe) for transmitting an uplink signal. In addition, one uplink/downlink subframe is divided into 2 time slots, and the length of each time slot is 0.5 ms. S denotes a special subframe, which contains three special time slots, i.e. a downlink pilot time slot (DwPTS), a guard period (GP) and an uplink pilot time slot (UpPTS). In an actual system, an uplink/downlink configuration index may be notified to a user equipment (UE) through a broadcasting message.

TABLE 1

| Configuration | Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |

A frame structure in a frequency division duplex (FDD) mode in the LTE system is also referred to as frame structure type 1, as shown in FIG. 2. One 10 ms radio frame is divided into 20 time slots, and the length of each time slot is 0.5 ms. 2 adjacent time slots constitutes a subframe of a length of 1 ms, i.e. subframe i is composed of time slot $2i$ and time slot $2i+1$, where $i=0, 1, 2, \ldots 9$. In the FDD mode, 10 subframes are all used for transmitting the uplink or downlink signals, and the uplink and downlink signals are differentiated from each other by different frequency bands.

In the LTE system, resource allocation is performed by taking a physical resource block (PRB, which is briefly referred to as a resource block (RB)) as a unit. One PRB occupies 12 subcarriers (a subcarrier also referred to as a resource element (RE), and the frequency of each subcarrier is 15 kHz) in a frequency domain, and occupies one time slot in a time domain, i.e. occupies 7 SC-FDMA symbols of normal cyclic prefix (Normal CP) or 6 SC-FDMA symbols of extended cyclic prefix (Extended CP) in the time domain. If an uplink system bandwidth corresponds to $N_{RB}^{UL}$ RBs in total in the frequency domain, the indexes of the RBs are 0, 1, ..., $N_{RB}^{UL}-1$, and the indexes of the REs are 0, 1, ..., $N_{RB}^{UL} \cdot N_{SC}^{RB}-1$, where $N_{SC}^{RB}$ is the number of the subcarriers that an RB corresponds to in the frequency domain. Taking the Normal CP for example, the structure of the PRB is shown in FIG. 3.

A scheduling request (SR) is a request signal sent from a UE to a base station when the UE hopes to send signals at a higher data rate. It is specified that the SR signal is transmitted over a physical uplink control channel (PUCCH). The UE acquires a corresponding SR periodicity and subframe offset according to an SR configuration index $I_{SR}$ sent from the base station, as shown in Table 2.

TABLE 2

| SR configuration index $I_{SR}$ | SR periodicity (ms) | SR subframe offset |
|---|---|---|
| 0-4 | 5 | $I_{SR}$ |
| 5-14 | 10 | $I_{SR} - 5$ |
| 15-34 | 20 | $I_{SR} - 15$ |
| 35-74 | 40 | $I_{SR} - 35$ |
| 75-154 | 80 | $I_{SR} - 75$ |
| 155 | OFF | N/A |

For example, if the SR configuration index $I_{SR}$ sent from the base station is 6, the UE can find that the SR periodicity is 10 ms and the SR subframe offset is $I_{SR}-5=6-5=1$ from Table 2.

According to the above-mentioned table, it is only determined how the UE can obtain a sending periodicity for the SR signal and the subframe offset thereof according to $I_{SR}$, but it is not indicated in which subframe of radio frame the UE sends the SR signal. This means that the UE cannot be ensured to utilize the radio frame sufficiently and effectively, and this even causes that the SR signal sent from the UE may not be received reliably by the base station. Therefore, it is currently required to propose a method which can allow the UE to determine the radio frame and subframe for sending the SR signal according to the SR sending periodicity and the subframe offset.

SUMMARY

The technical problem to be solved in the present invention is to provide a method and device for sending a scheduling request signal, which can ensure that every radio frame is utilized sufficiently and effectively when a terminal sends the SR signal to a base station.

To solve the above-mentioned problem, the present invention provides a method for sending an SR signal, which is used for a UE in an LTE system to send an uplink signal to a base station, the method comprises:

the UE determines a radio frame and a subframe for sending the SR signal: if a time length of a radio frame is less than an SR periodicity, a sending frame and a subframe for the SR signal are determined after shifting an SR subframe offset from a starting subframe of a first radio frame of multiple consecutive radio frames which have a total time length equal to the SR periodicity; if a time length of a radio frame is equal to or greater than the SR periodicity, each radio frame is determined as the sending frame for the SR signal, and if a time length of a radio frame is equal to the SR periodicity, a subframe of the sending frame is determined after shifting the SR subframe offset from the starting subframe of the sending frame; and if a time length of a radio frame is greater than the SR periodicity, a subframe of the sending frame is determined after shifting the SR subframe offset from the starting subframe of a radio half-frame; and the UE sends the SR signal to the base station in the determined subframe of the sending frame.

Further, the process of that the UE determines the radio frame and the subframe for sending the SR signal may comprise:

the UE may determine that a system frame number $n_f$ of the sending frame satisfies an equation $(10 \times n_f) \mod N_{SR\_P}=0$ if the SR subframe offset is 0; and the UE may determine that a system frame number $n_f$ of the sending frame satisfies an equation $$\left[10 \times \left(n_f \left\lfloor \frac{N_{OFFSET,SR}}{10} \right\rfloor \right)\right] \mod N_{SR\_P} = 0$$

if the SR subframe offset is not 0; and the UE may determine the subframe of the sending frame according to a time slot index $n_s$ that satisfies an equation $$\left(\left\lfloor \frac{n_s}{2} \right\rfloor - N_{OFFSET,SR} \mod 10\right) \mod N_{SR\_P} = 0;$$

in the above-mentioned equations, mod is a modulus operator, $N_{SR\_P}$ is the SR periodicity, $N_{OFFSET,SR}$ is the SR subframe offset, and $\lfloor \ \rfloor$ is a floor operator.

Further, the process of that the UE determines the radio frame and the subframe for sending the SR signal may comprise:

the UE may determine an $n_f$ that satisfies an equation $(10 \times n_f + \lfloor n_s/2 \rfloor - N_{OFFSET,SR}) \mod N_{SR\_P}=0$ as a system frame number of the sending frame, and may determine the subframe of the sending frame according to a time slot index $n_s$ that satisfies the equation, where mod is a modulus operator, $N_{SR\_P}$ is the SR periodicity, $N_{OFFSET,SR}$ is the SR subframe offset, and $\lfloor \ \rfloor$ is a floor operator.

Further, before the UE determines the radio frame and the subframe for sending the SR signal, the method may further comprise: the UE may determine the SR periodicity and the SR subframe offset according to an SR configuration index sent from the base station, namely the SR configuration index 0~155 may be divided into 6 portions: 0~4, 5~14, 15~34, 35~74, 75~154 and 155, which is used for indicating that the corresponding SR periodicity is 5 ms, 10 ms, 20 ms, 40 ms, 80 ms and OFF respectively; and the subframe offset of the first portion is equal to the corresponding SR configuration index of the portion; the subframe offset of any other portion is equal to the corresponding SR configuration index of the portion minus a summation of the SR periodicity of every portion prior to the portion; and OFF indicates periodicity closure.

To solve the above-mentioned problem, the present invention provides a device for sending a SR signal, which is used for a UE in an LTE system to send an uplink signal to a base station, the device comprises a radio frame and subframe determining module and a sending module which are connected with each other, wherein the radio frame and subframe determining module is used for determining a radio frame and a subframe thereof for sending the SR signal according to an SR subframe offset and an SR periodicity: if a time length of a radio frame is less than the SR periodicity, a sending frame and a subframe for the SR signal are determined after shifting the SR subframe offset from a starting subframe of a first radio frame of multiple consecutive radio frames which have a total time length equal to the SR periodicity; if a time length of a radio frame is equal to or greater than the SR periodicity, each radio frame is determined as the sending frame for the SR signal, and if a time length of a radio frame is equal to the SR periodicity, a subframe of the sending frame is determined after shifting the SR subframe offset from the starting subframe of the sending frame; if a time length of a radio frame is greater than the SR periodicity, a subframe of the sending frame is determined after shifting the SR subframe offset from the starting subframe of a radio half-frame; and for outputting the determined radio frame and the subframe thereof for sending the SR signal to the sending module; and the sending module is used for sending the SR signal to the base station in the determined subframe of the sending frame.

Further, the process of that the radio frame and subframe determining module determines the radio frame and the subframe thereof for sending the SR signal may mean that the radio frame and subframe determining module may be used for:

determining a system frame number $n_f$ of the sending frame satisfies an equation $(10 \times n_f) \mod N_{SR\_P}=0$ if the SR subframe offset is 0; and determining a system frame number $n_f$ of the sending frame satisfies an equation $$\left[10 \times \left(n_f \left\lfloor \frac{N_{OFFSET,SR}}{10} \right\rfloor \right)\right] \mod N_{SR\_P} = 0$$

if the SR subframe offset is not 0; and determining the subframe of the sending frame according to a time slot index $n_s$ that satisfies an equation $$\left(\left\lfloor \frac{n_s}{2} \right\rfloor - N_{OFFSET,SR} \mod 10\right) \mod N_{SR\_P} = 0,$$

in the above-mentioned equations, mod is a modulus operator, $N_{SR\_P}$ is the SR periodicity, $N_{OFFSET,SR}$ is the SR subframe offset, and $\lfloor \ \rfloor$ is a floor operator.

Further, the process of that the radio frame and subframe determining module determines the radio frame and the subframe thereof for sending the SR signal may mean that the radio frame and subframe determining module may be used for: determining an $n_f$ that satisfies an equation $(10 \times n_f + \lfloor n_s/2 \rfloor - N_{OFFSET,SR}) \mod N_{SR\_P}=0$ as a system frame number of the sending frame, and determining the subframe of the sending frame according to a time slot index $n_s$ that satisfies the equation, where mod is a modulus operator, $N_{SR\_P}$ is the SR periodicity, $N_{OFFSET,SR}$ is the SR subframe offset, and $\lfloor \ \rfloor$ is a floor operator.

Further, the device may further comprise an SR periodicity and subframe offset determining module connected to the radio frame and subframe determining module, the SR periodicity and subframe offset determining module may be used for determining the SR periodicity and the SR subframe offset according to an SR configuration index sent from the base station, namely the SR configuration index 0~155 may be divided into 6 portions: 0~4, 5~14, 15~34, 35~74, 75~154 and 155 which is used for indicating that the corresponding SR periodicity is 5 ms, 10 ms, 20 ms, 40 ms, 80 ms and OFF respectively; and the subframe offset of the first portion is equal to the corresponding SR configuration index of the portion; the subframe offset of any other portion is equal to the corresponding SR configuration index of the portion minus a summation of the SR periodicity of every portion prior to the portion; OFF indicates periodicity closure; and for outputting the determined SR periodicity and SR subframe offset to the radio frame and subframe determining module.

According to the method and device provided by the present invention, the terminal can complete a whole mapping process from the SR periodicity and subframe offset to the specific sending subframe when it sends the SR signal to the base station. Since it is ensured that the receiving position of the base station is identical to the sending position of a mobile phone, and also that there are as much as suitable radio frames in a radio frame number periodicity being used for sending the SR signal, it can be ensured that the SR signal sent from the UE can be received reliably by the base station, and also ensured that the UE utilizes the radio frame sufficiently and effectively.

DETAILED DESCRIPTION

Figure 1:
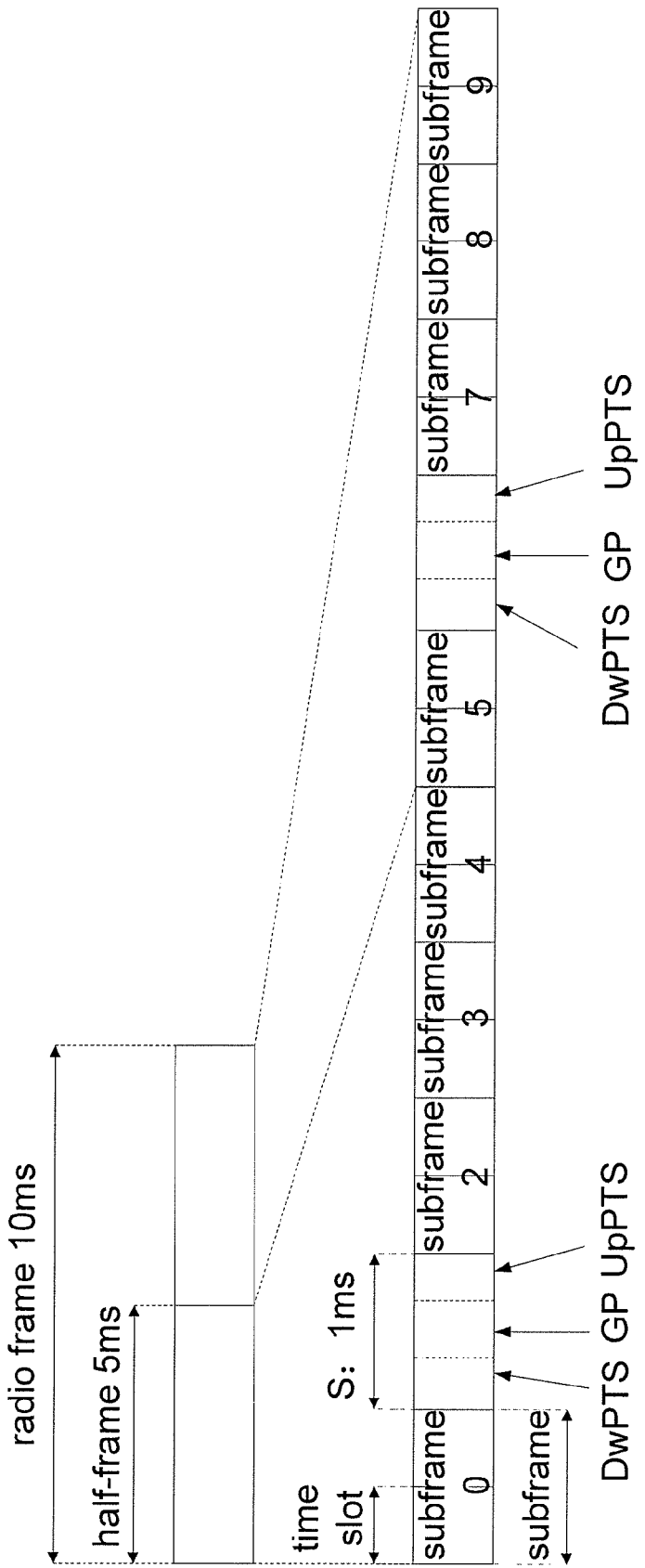
FIG. 1 is a schematic diagram illustrating a frame structure in a TDD mode in an LTE system.
Figure 2:
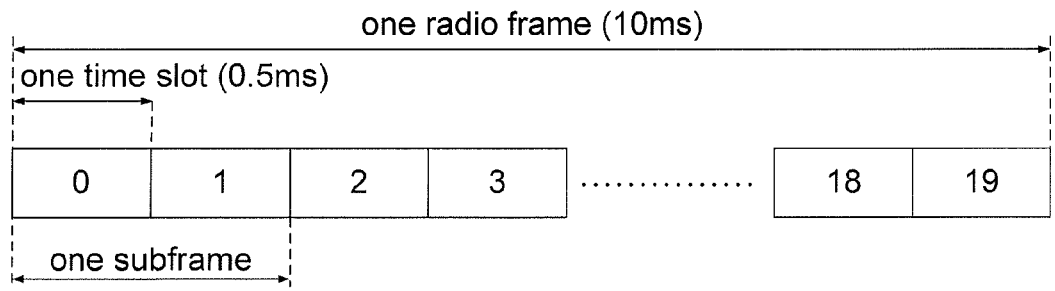
FIG. 2 is a schematic diagram illustrating a frame structure in an FDD mode in the LTE system.
Figure 3:
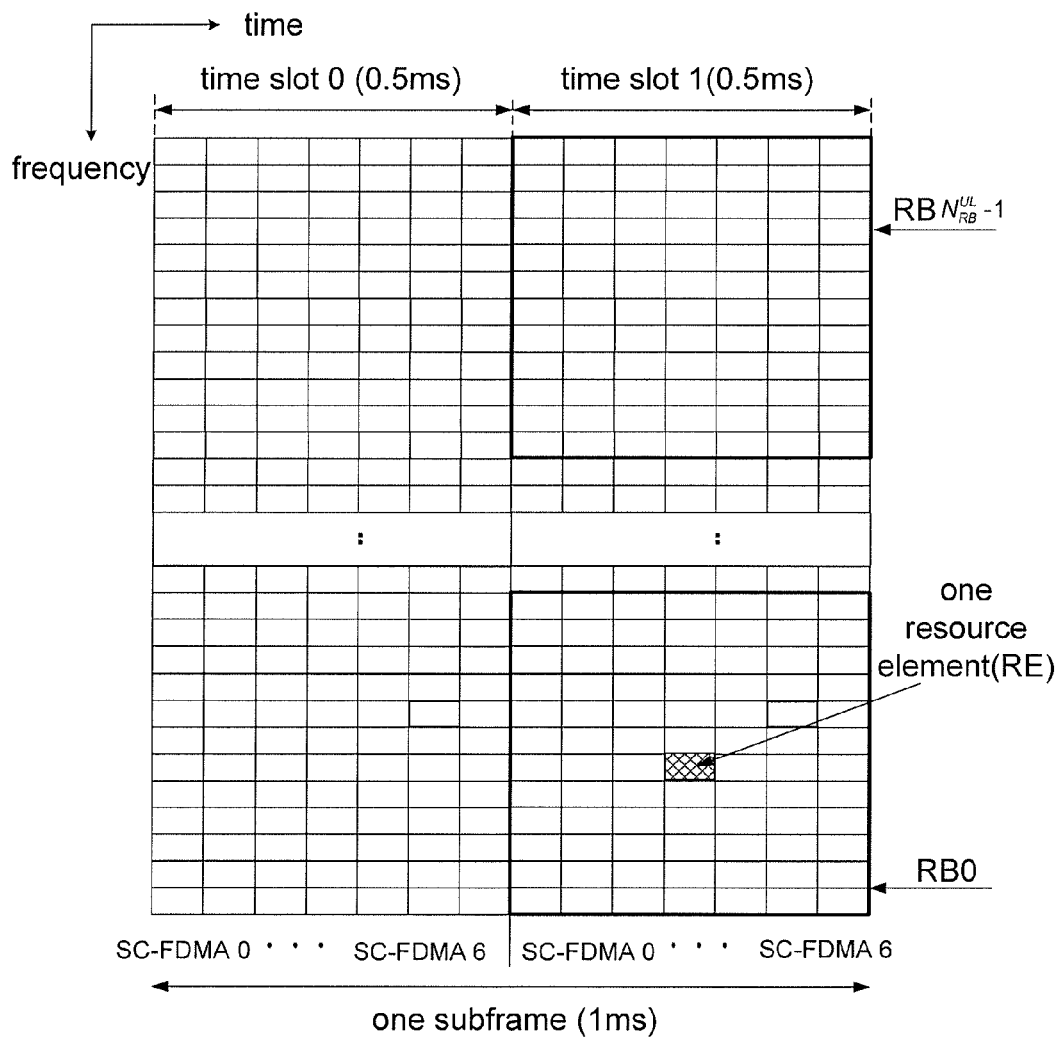
FIG. 3 is a schematic diagram illustrating a structure of a PRB.

A method for sending a scheduling request signal according to the present invention is used for a UE in an LTE system to send an uplink signal to a base station. The method which is implemented by a corresponding device in the UE includes: the UE determines an SR periodicity and an SR subframe offset according to an SR configuration index; if a time length of a radio frame is less than the SR periodicity, the UE determines a frame and a subframe for sending the SR signal after shifting the SR subframe offset from a starting subframe of a first radio frame of multiple consecutive radio frames which have a total time length equal to the SR periodicity; if a time length of a radio frame is equal to or greater than the SR periodicity, each radio frame is determined as the sending frame for the SR signal, and if a time length of a radio frame is equal to the SR periodicity, a subframe of the sending frame is determined after shifting the SR subframe offset from the starting subframe of the sending frame; if a time length of a radio frame is greater than the SR periodicity, a subframe of the sending frame is determined after shifting the SR subframe offset from the starting subframe of a radio half-frame; and the UE sends the SR signal to the base station in the determined subframe of the radio frame.

If a time length of a radio frame is less than the SR periodicity, the process of that the UE determines a frame and a subframe for sending the SR signal after shifting the SR subframe offset from a starting subframe of a first radio frame of multiple consecutive radio frames which have a total time length equal to the SR means: taking the starting subframe of the first radio frame of multiple consecutive radio frames which have a total time length equal to the SR periodicity as a starting position, taking the subframe which is positioned after shifting the SR subframe offset from the starting frame as the sending subframe for the SR signal, and taking the radio frame which the subframe belongs to as the sending frame for the SR signal.

If a time length of a radio frame is equal to the SR periodicity, the process of that a subframe of the sending frame is determined after shifting the SR subframe offset from the starting subframe of the sending frame means: taking the starting subframe of the sending frame as the starting position, and taking the subframe which is positioned after shifting the SR subframe offset from the starting frame as the sending subframe for the SR signal.

If a time length of a radio frame is greater than the SR periodicity, the process of that a subframe of the sending frame is determined after shifting the SR subframe offset from the starting subframe of a radio half-frame means: taking the starting subframe of the radio half-frame as the starting position, and taking the subframe which is positioned after shifting the SR subframe offset from the starting frame as the sending subframe for the SR signal.

The above-mentioned method and the corresponding device will be explained and described in detail hereinafter with reference to the accompanying drawings and preferred embodiments. These embodiments are merely for explanation, and the present invention is not limited thereto.

Figure 4:
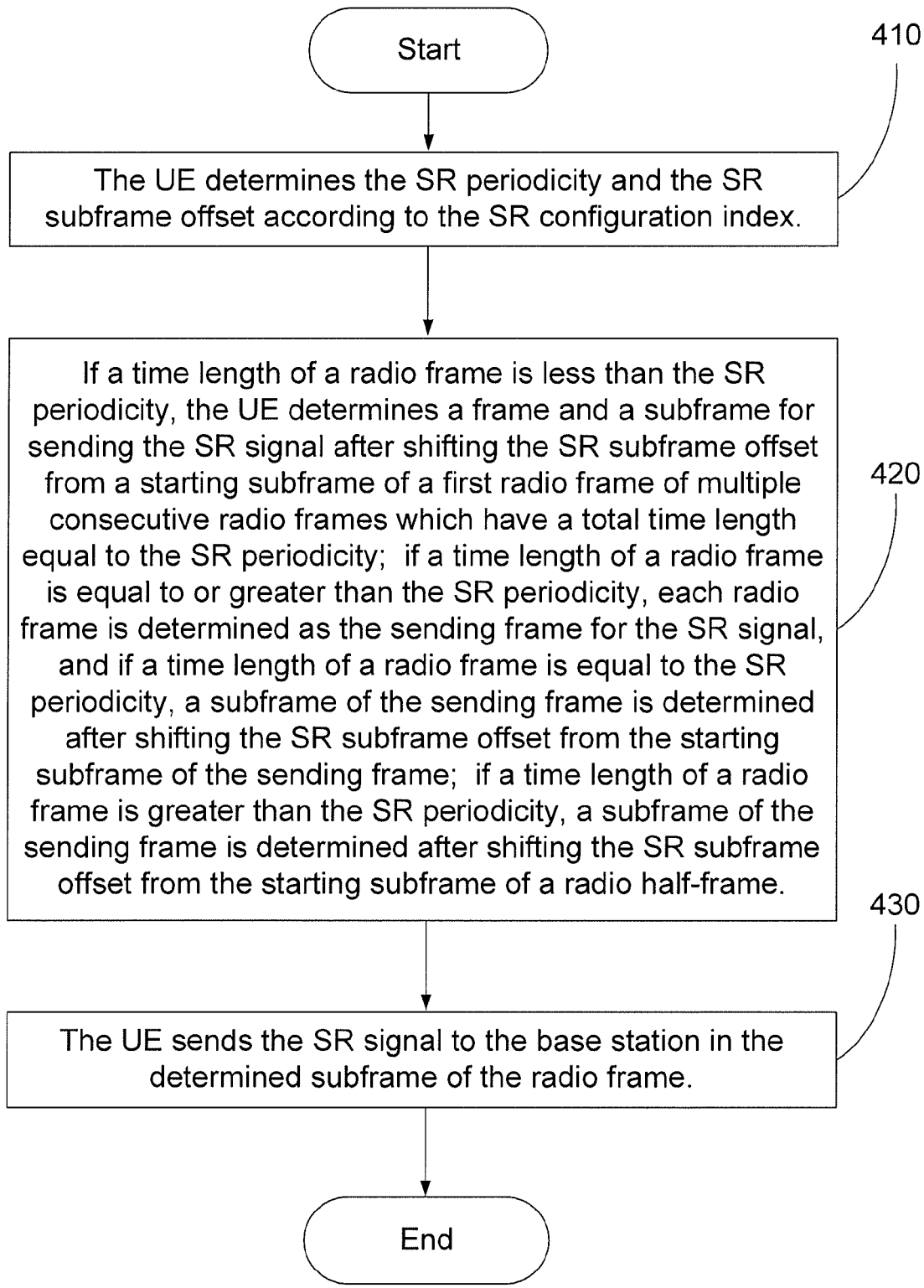
FIG. 4 is a flow chart illustrating a method for sending an SR signal according to the present invention.

FIG. 4 is a flow chart illustrating a method for sending an SR signal according to the present invention. The procedure includes the following steps.

Step 410: The UE determines the SR periodicity and the SR subframe offset according to the SR configuration index. The determination method is as shown in Table 2.

Step 420: The UE determines the radio frame for sending the SR and the sub-frame thereof according to the SR periodicity and the SR subframe offset.

The determination method is as follows: if a time length of a radio frame is less than the SR periodicity, the UE determines a frame and a subframe for sending the SR signal after shifting the SR subframe offset from a starting subframe of a first radio frame of multiple consecutive radio frames which have a total time length equal to the SR periodicity; if a time length of a radio frame is equal to or greater than the SR periodicity, each radio frame is determined as the sending frame for the SR signal, and if a time length of a radio frame is equal to the SR periodicity, a subframe of the sending frame is determined after shifting the SR subframe offset from the starting subframe of the sending frame; if a time length of a radio frame is greater than the SR periodicity, a subframe of the sending frame is determined after shifting the SR subframe offset from the starting subframe of a radio half-frame.

specific methods are as follows.

Method 1

The UE determines that a system frame number $n_f$ of the sending frame satisfies an equation $(10 \times n_f) \bmod N_{SR\_P} = 0$ if the SR subframe offset is 0; and the UE determines that a system frame number $n_f$ of the sending frame satisfies an equation $$\left[10 \times \left(n_f \left\lfloor \frac{N_{OFFSET,SR}}{10} \right\rfloor \right)\right] \bmod N_{SR\_P} = 0$$

if the SR subframe offset is not 0; and the UE determines the subframe of the sending frame according to a time slot index $n_s$ that satisfies an equation $$\left(\left\lfloor \frac{n_s}{2} \right\rfloor - N_{OFFSET,SR} \bmod 10 \right) \bmod N_{SR\_P} = 0;$$

in the above-mentioned equations, mod is a modulus operator, $N_{SR\_P}$ is the SR periodicity, $N_{OFFSET,SR}$ is the SR subframe offset, and $\lfloor \ \rfloor$ is a floor operator.

Method 2

The UE determines an $n_f$ that satisfies an equation $(10 \times n_f + \lfloor n_s/2 \rfloor - N_{OFFSET,SR}) \bmod N_{SR\_P} = 0$ as a system frame number of the sending frame, and determines the subframe of the sending frame according to a time slot index $n_s$ that satisfies the equation, where mod is a modulus operator, $N_{SR\_P}$ is the SR periodicity, $N_{OFFSET,SR}$ is the SR subframe offset, and $\lfloor \ \rfloor$ is a floor operator.

Step 430: The UE sends the SR signal to the base station in the determined subframe of the radio frame having the system frame number $n_f$.

Embodiment 1

If the SR periodicity $N_{SR\_P}$ is 5 ms and the subframe offset $N_{OFFSET,SR}$ is 2, the system frame number $n_f$ of the subframe and the radio frame for sending the SR signal satisfies the equation $(10 \times n_f + \lfloor n_s/2 \rfloor - N_{OFFSET,SR}) \bmod N_{SR\_P} = 0$, where $n_s$ is the time slot index.

$N_{SR\_P} = 5$, $N_{OFFSET,SR} = 2$ are introduced into the above-mentioned equation, then the system frame number $n_f$ of the subframe and the radio frame for sending the SR signal satisfies $(10 \times n_f + \lfloor n_s/2 \rfloor - 2) \bmod 5 = 0$.

If $n_f = 0$,
since $N_{OFFSET,SR} = 2$, $n_s = 4$, 5 or $n_s = 14$, 15,
$(10 \times 0 + 4/2 - 2) \bmod 5 = 0 \bmod 5 = 0$, where the condition is satisfied,
$(10 \times 0 + 5/2 - 2) \bmod 5 = 0.5 \bmod 5 = 0$, where the condition is satisfied,
thus subframe 2, i.e. the $3^{rd}$ subframe, satisfies the above-mentioned condition;
similarly, subframe 7, i.e. the $8^{th}$ subframe, also satisfies the above-mentioned condition; and
similarly, if $n_f = 1, 2, \ldots$, every $3^{rd}$ subframe and every $8^{th}$ subframe satisfy the above-mentioned condition.

Therefore, the UE sends the SR signal in the $3^{rd}$ subframe (subframe 2, corresponding to time slot number 4, 5) and the $8^{th}$ subframe (subframe 7, corresponding to time slot number 14, 15) of each radio frame.

Embodiment 2

If the SR periodicity $N_{SR\_P}$ is 10 ms and the subframe offset $N_{OFFSET,SR}$ is 2, the system frame number $n_f$ of the subframe and the radio frame for sending the SR signal satisfies the equation $(10 \times n_f + \lfloor n_s/2 \rfloor - N_{OFFSET,SR}) \bmod N_{SR\_P} = 0$, where $n_s$ is the time slot index. $N_{SR\_P} = 10$, $N_{OFFSET,SR} = 2$ are introduced into the above-mentioned equation, then the system frame number $n_f$ of the subframe and the radio frame for sending the SR signal satisfies $(10 \times n_f + \lfloor n_s/2 \rfloor - 2) \bmod 10 = 0$.

If $n_f = 0$,
since $N_{OFFSET,SR} = 2$, $n_s = 4$, 5 or $n_s = 14$, 15,
$(10 \times 0 + 4/2 - 2) \bmod 10 = 0 \bmod 10 = 0$, where the condition is satisfied,
$(10 \times 0 + 5/2 - 2) \bmod 10 = 0.5 \bmod 10 = 0$, where the condition is satisfied,
thus subframe 2, i.e. the $3^{rd}$ subframe, satisfies the above-mentioned condition; and
$(10 \times 0 + 14/2 - 2) \bmod 10 = 5 \bmod 10 = 5$, where the condition is not satisfied,
$(10 \times 0 + 15/2 - 2) \bmod 10 = 5.5 \bmod 10 = 5$, where the condition is not satisfied,
thus subframe 7, i.e. the $8^{th}$ subframe, does not satisfy the above-mentioned condition.

Similarly, if $n_f = 1, 2, \ldots$, every $3^{rd}$ subframe satisfies the above-mentioned condition.

Therefore, the UE sends the SR signal in the $3^{rd}$ subframe (subframe 2, corresponding to time slot number 4, 5) of each radio frame.

Embodiment 3

If the SR periodicity $N_{SR\_P}$ is 20 ms and the subframe offset $N_{OFFSET,SR}$ is 12, the system frame number $n_f$ of the subframe and the radio frame for sending the SR signal satisfies the equation $(10 \times n_f + \lfloor n_s/2 \rfloor - N_{OFFSET,SR}) \bmod N_{SR\_P} = 0$, where $n_s$ is the time slot index.

If $n_f = 0$,
since $N_{OFFSET,SR} = 12$, $n_s = 4$, 5,
$(10 \times 0 + 4/2 - 2) \bmod 20 = 0 \bmod 20 = 0$, where the condition is satisfied,
$(10 \times 0 + 5/2 - 2) \bmod 20 = 0.5 \bmod 20 = 0$, where the condition is satisfied,
thus the $3^{rd}$ subframe, i.e. subframe 2, of the $1^{st}$ radio frame satisfies the above-mentioned condition;
if $n_f = 1$,
$(10 \times 1 + 4/2 - 2) \bmod 20 = 10 \bmod 20 = 10$, where the condition is not satisfied,
$(10 \times 1 + 5/2 - 2) \bmod 20 = 10.5 \bmod 20 = 10$, where the condition is not satisfied;
if $n_f = 2$,
$(10 \times 2 + 4/2 - 2) \bmod 20 = 20 \bmod 20 = 0$, where the condition is satisfied,
$(10 \times 2 + 5/2 - 2) \bmod 20 = 20.5 \bmod 20 = 0$, where the condition is satisfied;
if $n_f = 3$,
$(10 \times 3 + 4/2 - 2) \bmod 20 = 30 \bmod 20 = 10$, where the condition is not satisfied,
$(10 \times 3 + 5/2 - 2) \bmod 20 = 0.5 \bmod 20 = 10$, where the condition is not satisfied; and . . .

Therefore, the UE sends the SR signal in the $3^{rd}$ subframe (corresponding to time slot number 4, 5) of the radio frame having an odd $n_f$ (the $1^{st}$, $3^{rd}$, $5^{th}$ . . . radio frame, i.e. $n_f = 0$, $n_f = 2$, $n_f = 4$ . . . ).

Figure 5:
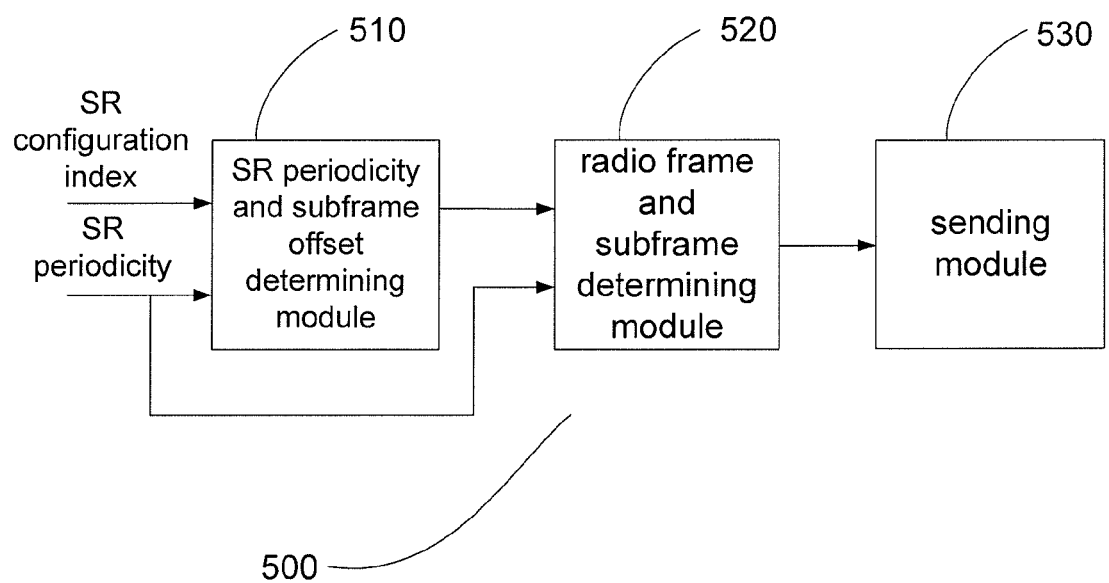
FIG. 5 is a block diagram illustrating a structure of a device for sending the SR signal in a UE according to the present invention.

FIG. 5 illustrates a device for sending the SR signal that is devised based on the above-mentioned method in the present invention. The device 500 includes an SR periodicity and subframe offset determining module 510, a radio frame and subframe determining module 520 and a sending module 530 which are connected in turn.

The SR periodicity and subframe offset determining module 510 is used for determining an SR periodicity and an SR subframe offset according to an SR configuration index, and outputting the determined SR periodicity and SR subframe offset to the radio frame and subframe determining module 520.

The determination method is shown in Table 2.

The radio frame and subframe determining module 520 is used for determining a radio frame and a subframe for sending the SR signal according to the inputted SR periodicity and SR subframe offset, and outputting the determined radio frame and subframe to the sending module.

If a time length of a radio frame is less than the SR periodicity, the radio frame and subframe determining module 520 determines a frame and a subframe for sending the SR signal after shifting the SR subframe offset from a starting subframe of a first radio frame of multiple consecutive radio frames which have a total time length equal to the SR periodicity; if a time length of a radio frame is equal to or greater than the SR periodicity, each radio frame is determined as the sending frame for the SR signal, and if a time length of a radio frame is equal to the SR periodicity, a subframe of the sending frame is determined after shifting the SR subframe offset from the starting subframe of the sending frame; if a time length of a radio frame is greater than the SR periodicity, a subframe of the sending frame is determined after shifting the SR subframe offset from the starting subframe of a radio half-frame.

The sending module 530 is used for sending the SR signal to the base station in the determined subframe of the radio frame.

The foregoing is merely preferred embodiments of the present invention, and the present invention is not limited thereto. Those skilled in the art may devise various alterations and variations for the present invention. Any modifications, equivalents, improvements, or the like made without departing from the spirit and principle of the present invention are intended to fall into the scope of the present invention.

INDUSTRIAL APPLICABILITY

According to the present invention, the terminal can complete a whole mapping process from the SR periodicity and subframe offset to the specific sending subframe when it sends the SR signal to the base station, thus it can be ensured that the SR signal sent from the UE can be received reliably by the base station, and also ensured that the UE can utilize the radio frame sufficiently and effectively.

What is claimed is:

1. A method for sending a scheduling request (SR) signal, which is used for a user equipment (UE) in a long term evolution system to send an uplink signal to a base station, comprising:

the UE determining a radio frame and a subframe for sending the SR signal: if a time length of a radio frame is less than an SR periodicity, a sending frame and a subframe for the SR signal are determined after shifting an SR subframe offset from a starting subframe of a first radio frame of multiple consecutive radio frames which have a total time length equal to the SR periodicity; if a time length of a radio frame is equal to or greater than the SR periodicity, each radio frame is determined as the sending frame for the SR signal, and if a time length of a radio frame is equal to the SR periodicity, a subframe of the sending frame is determined after shifting the SR subframe offset from the starting subframe of the sending frame, and if a time length of a radio frame is greater than the SR periodicity, a subframe of the sending frame is determined after shifting the SR subframe offset from the starting subframe of a radio half-frame; and the UE sending the SR signal to the base station in the determined subframe of the sending frame.

2. The method according to claim 1, wherein the process of that the UE determines the radio frame and the subframe for sending the SR signal comprises:

the UE determines that a system frame number $n_f$ of the sending frame satisfies an equation $(10 \times n_f) \bmod N_{SR\_P}=0$ if the SR subframe offset is 0; and the UE determines that a system frame number $n_f$ of the sending frame satisfies an equation $$\left[10 \times \left(n_f \left\lfloor \frac{N_{OFFSET,SR}}{10} \right\rfloor\right)\right] \bmod N_{SR\_P} = 0$$

if the SR subframe offset is not 0; and the UE determines the subframe of the sending frame according to a time slot index $n_s$ that satisfies an equation $$\left(\left\lfloor \frac{n_s}{2} \right\rfloor - N_{OFFSET,SR} \bmod 10\right) \bmod N_{SR\_P} = 0;$$

in the above-mentioned equations, mod is a modulus operator, $N_{SR\_P}$ is the SR periodicity, $N_{OFFSET,SR}$ is the SR subframe offset, and $\lfloor \ \rfloor$ is a floor operator.

3. The method according to claim 1, wherein the process of that the UE determines the radio frame and the subframe for sending the SR signal comprises:

the UE determines an $n_f$ that satisfies an equation $(10 \times n_f + \lfloor n_s/2 \rfloor - N_{OFFSET,SR}) \bmod N_{SR\_P}=0$ as a system frame number of the sending frame, and determines the subframe of the sending frame according to a time slot index $n_s$ that satisfies the equation, where mod is a modulus operator, $N_{SR\_P}$ is the SR periodicity, $N_{OFFSET,SR}$ is the SR subframe offset, and $\lfloor \ \rfloor$ is a floor operator.

4. The method according to claim 1, before the UE determines the radio frame and the subframe for sending the SR signal, further comprising: the UE determining the SR periodicity and the SR subframe offset according to an SR configuration index sent from the base station, namely the SR configuration index 0~155 is divided into 6 portions: 0~4, 5~14, 15~34, 35~74, 75~154 and 155, which is used for indicating that the corresponding SR periodicity is 5 ms, 10 ms, 20 ms, 40 ms, 80 ms and OFF respectively; and the subframe offset of the first portion is equal to the corresponding SR configuration index of the portion; the subframe offset of any other portion is equal to the corresponding SR configuration index of the portion minus a summation of the SR periodicity of every portion prior to the portion; and OFF indicates periodicity closure.

5. The method according to claims 2, before the UE determines the radio frame and the subframe for sending the SR signal, further comprising: the UE determining the SR periodicity and the SR subframe offset according to an SR configuration index sent from the base station, namely the SR configuration index 0~155 is divided into 6 portions: 0~4, 5~14, 15~34, 35~74, 75~154 and 155, which is used for indicating that the corresponding SR periodicity is 5 ms, 10 ms, 20 ms, 40 ms, 80 ms and OFF respectively; and the subframe offset of the first portion is equal to the corresponding SR configuration index of the portion; the subframe offset of any other portion is equal to the corresponding SR configuration index of the portion minus a summation of the SR periodicity of every portion prior to the portion; and OFF indicates periodicity closure.

6. The method according to claim 3, before the UE determines the radio frame and the subframe for sending the SR signal, further comprising: the UE determining the SR periodicity and the SR subframe offset according to an SR configuration index sent from the base station, namely the SR configuration index 0~155 is divided into 6 portions: 0~4, 5~14, 15~34, 35~74, 75~154 and 155, which is used for indicating that the corresponding SR periodicity is 5 ms, 10 ms, 20 ms, 40 ms, 80 ms and OFF respectively; and the subframe offset of the first portion is equal to the corresponding SR configuration index of the portion; the subframe offset of any other portion is equal to the corresponding SR configuration index of the portion minus a summation of the SR periodicity of every portion prior to the portion; and OFF indicates periodicity closure.

7. A device for sending a scheduling request (SR) signal, which is used for a user equipment (UE) in a long term evolution system to send an uplink signal to a base station, comprising a radio frame and subframe determining module and a sending module which are connected with each other, wherein the radio frame and subframe determining module, is used for determining a radio frame and a sub-frame thereof for sending the SR signal according to an SR subframe offset and an SR periodicity: if a time length of a radio frame is less than the SR periodicity, a sending frame and a subframe for the SR signal are determined after shifting the SR subframe offset from a starting subframe of a first radio frame of multiple consecutive radio frames which have a total time length equal to the SR periodicity; if a time length of a radio frame is equal to or greater than the SR periodicity, each radio frame is determined as the sending frame for the SR signal, and if a time length of a radio frame is equal to the SR periodicity, a subframe of the sending frame is determined after shifting the SR subframe offset from the starting subframe of the sending frame; if a time length of a radio frame is greater than the SR periodicity, a subframe of the sending frame is determined after shifting the SR subframe offset from the starting subframe of a radio half-frame; and for outputting the determined radio frame and the sub-frame thereof for sending the SR signal to the sending module; and the sending module, is used for sending the SR signal to the base station in the determined sub-frame of the sending frame.

8. The device according to claim 7, wherein the process of that the radio frame and subframe determining module determines the radio frame and the subframe thereof for sending the SR signal means that the radio frame and subframe determining module is used for:

determining a system frame number $n_f$ of the sending frame satisfies an equation $(10 \times n_f) \bmod N_{SR\_P} = 0$ if the SR subframe offset is 0; and determining a system frame number $n_f$ of the sending frame satisfies an equation $$\left[10 \times \left(n_f \left\lfloor \frac{N_{OFFSET,SR}}{10} \right\rfloor \right)\right] \bmod N_{SR\_P} = 0$$

if the SR subframe offset is not 0; and determining the subframe of the sending frame according to a time slot index $n_s$ that satisfies an equation $$\left(\left\lfloor \frac{n_s}{2} \right\rfloor - N_{OFFSET,SR} \bmod 10 \right) \bmod N_{SR\_P} = 0,$$

in the above-mentioned equations, mod is a modulus operator, $N_{SR\_P}$ is the SR periodicity, $N_{OFFSET,SR}$ is the SR subframe offset, and $\lfloor \ \rfloor$ is a floor operator.

9. The device according to claim 7, wherein the process of that the radio frame and subframe determining module determines the radio frame and the subframe thereof for sending the SR signal means that the radio frame and subframe determining module is used for: determining an $n_f$ that satisfies an equation $(10 \times n_f + \lfloor n_s/2 \rfloor - N_{OFFSET,SR}) \bmod N_{SR\_P} = 0$ as a system frame number of the sending frame, and determining the subframe of the sending frame according to a time slot index $n_s$ that satisfies the equation, where mod is a modulus operator, $N_{SR\_P}$ is the SR periodicity, $N_{OFFSET,SR}$ is the SR subframe offset, and $\lfloor \ \rfloor$ is a floor operator.

10. The device according to claim 7, further comprising an SR periodicity and subframe offset determining module connected to the radio frame and subframe determining module, the SR periodicity and subframe offset determining module, is used for determining the SR periodicity and the SR subframe offset according to an SR configuration index sent from the base station, namely the SR configuration index 0~155 is divided into 6 portions: 0~4, 5~14, 15~34, 35~74, 75~154 and 155 which is used for indicating that the corresponding SR periodicity is 5 ms, 10 ms, 20 ms, 40 ms, 80 ms and OFF respectively; and the subframe offset of the first portion is equal to the corresponding SR configuration index of the portion; the subframe offset of any other portion is equal to the corresponding SR configuration index of the portion minus a summation of the SR periodicity of every portion prior to the portion; OFF indicates periodicity closure; and for outputting the determined SR periodicity and SR subframe offset to the radio frame and subframe determining module.

11. The device according to claim 8, further comprising an SR periodicity and subframe offset determining module connected to the radio frame and subframe determining module, the SR periodicity and subframe offset determining module, is used for determining the SR periodicity and the SR subframe offset according to an SR configuration index sent from the base station, namely the SR configuration index 0~155 is divided into 6 portions: 0~4, 5~14, 15~34, 35~74, 75~154 and 155 which is used for indicating that the corresponding SR periodicity is 5 ms, 10 ms, 20 ms, 40 ms, 80 ms and OFF respectively; and the subframe offset of the first portion is equal to the corresponding SR configuration index of the portion; the subframe offset of any other portion is equal to the corresponding SR configuration index of the portion minus a summation of the SR periodicity of every portion prior to the portion; OFF indicates periodicity closure; and for outputting the determined SR periodicity and SR subframe offset to the radio frame and subframe determining module.

12. The device according to claim 9, further comprising an SR periodicity and subframe offset determining module connected to the radio frame and subframe determining module, the SR periodicity and subframe offset determining module, is used for determining the SR periodicity and the SR subframe offset according to an SR configuration index sent from the base station, namely the SR configuration index 0~155 is divided into 6 portions: 0~4, 5~14, 15~34, 35~74, 75~154 and 155 which is used for indicating that the corresponding SR periodicity is 5 ms, 10 ms, 20 ms, 40 ms, 80 ms and OFF respectively; and the subframe offset of the first portion is equal to the corresponding SR configuration index of the portion; the subframe offset of any other portion is equal to the corresponding SR configuration index of the portion minus a summation of the SR periodicity of every portion prior to the portion; OFF indicates periodicity closure; and for outputting the determined SR periodicity and SR subframe offset to the radio frame and subframe determining module.

* * * * *